May 22, 1956 — J. F. BRUNNER, JR — 2,746,776
SEALING DEVICE FOR RELATIVELY ROTATABLE PARTS
Filed May 31, 1952

JOSEPH F. BRUNNER, JR.
INVENTOR.

BY
ATTORNEY.

United States Patent Office 2,746,776
Patented May 22, 1956

2,746,776

SEALING DEVICE FOR RELATIVELY ROTATABLE PARTS

Joseph F. Brunner, Jr., San Marino, Calif., assignor to Kay-Brunner Steel Products, Inc., a corporation of Delaware Application May 31, 1952, Serial No. 290,945

2 Claims. (Cl. 286—5)

My invention relates to seals for confining a lubricant within bearing assemblies between relatively rotatable parts.

Considerable difficulty has been experienced in sealing the wheel bearings of trailer axles against escape of grease from the wheel hub, as well as preventing intrusion of dirt, and water into the bearings. In trailers used for various purposes, and particularly logging trailers, where large brake drums are fixed on the wheel hubs, the heat generated by frequent brake applications is transmitted to the wheel bearings causing the grease to become thin and run out of the wheel hub. This not only results in burning out of the bearing, but the liquid grease leaks into the brake drum and thus renders the brake ineffective. If dirt, water or any other foreign matter is permitted to enter the wheel hub, the bearings naturally lose their anti-friction property.

It is a purpose of my invention to provide a sealing device particularly adapted, although not necessarily, for use in the wheel hubs of axles for logging trailers, and which is designed and adapted to confine lubricant within the bearing assemblies for such hubs, as well as to prevent intrusion of dirt, water and other foreign matter into the bearing assemblies.

It is also a purpose of my invention to provide a sealing device which is highly efficient, simple to manufacture and assemble, and free from the failures incident to the use of previous seals proposed for utilization in assemblies of the character set forth herein.

A further purpose of my invention is the provision of a combination sealing device and trailer axle, wherein the two have means coacting upon application of the device to the axle for locking the device on the axle in oil-sealing position between the wheel hub and the axle.

Also, it is a purpose of my invention to provide, as an article of manufacture, a sealing device made from stamped steel sheets of suitable gauge and including a body comprising a pair of identical annuli constructed and associated one with the other so as to form an annular groove or channel in the outer periphery thereof, and collars on the inner periphery thereof, one of which is utilized to secure the body against rotation on the axle, and a split expanding metal ring received in the groove and frictionally engaging the inner wall of the wheel hub so as to be rotatable therewith and in fluid sealing engagement with both the body and the hub.

Other purposes will appear as the description proceeds in connection with the appended claims and accompanying drawing, where:

Figure 1:
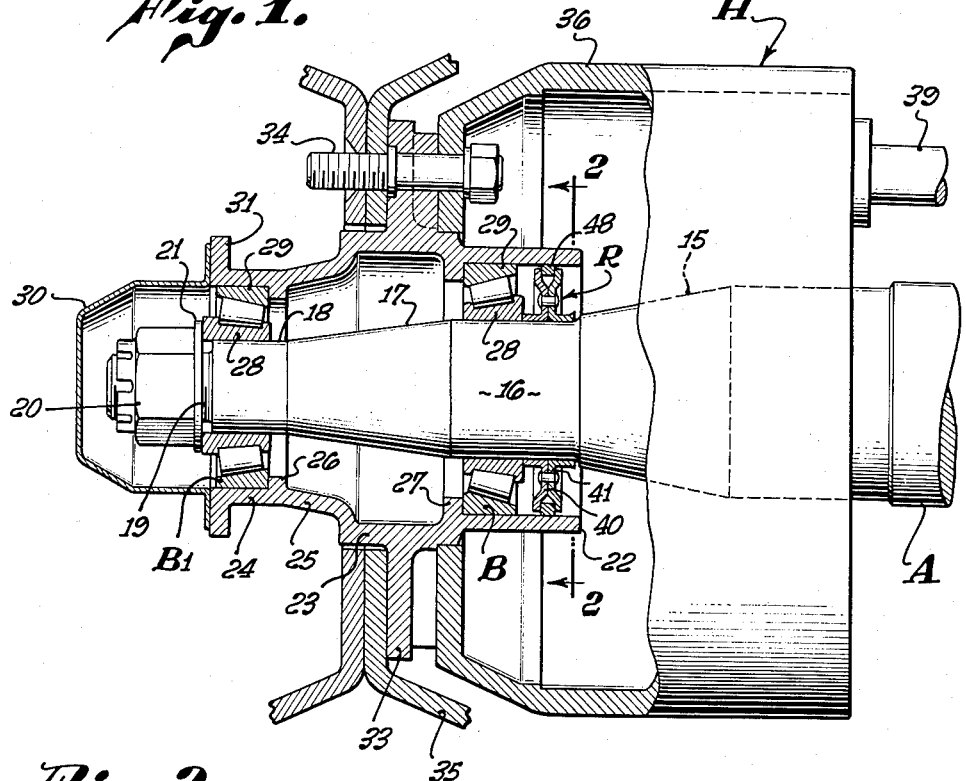
Fig. 1 is a longitudinal sectional view, partly in elevation, of one end of an axle and wheel hub and brake assembly for a trailer, with one form of sealing device, embodying my invention, applied thereto.
Figure 2:
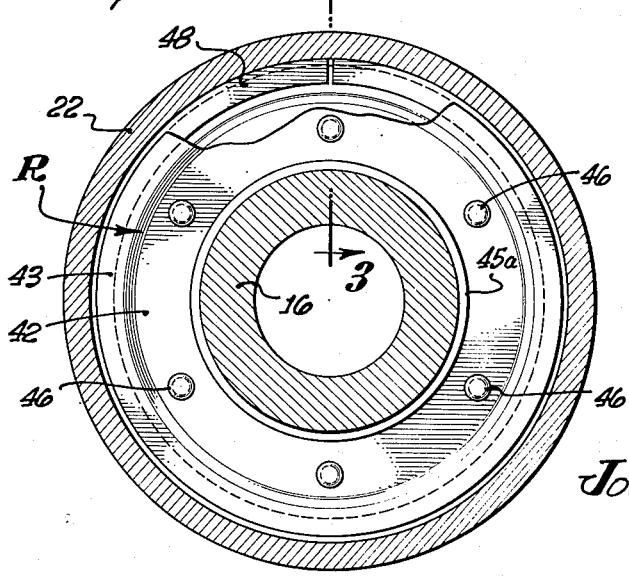
Fig. 2 is an enlarged vertical sectional view taken on the line 2—2 of Fig. 1.

Referring specifically to the drawings, in Fig. 1 is shown one end of an axle A which is non-rotatable since it is used on a trailer. The axle at each end is constructed with a portion 15 tapering into a cylindrical portion 16, a second tapered, but smaller, portion 17 at the other end of the cylindrical portion, and a second cylindrical portion 18 at the end of the tapered portion 17. Extending from the portion 18 is a screw-threaded portion 19 which receives a castillated nut 20 and a washer 21.

By means of an inner anti-friction bearing assembly B and an outer anti-friction bearing assembly B1, a wheel hub H is rotatably mounted on the end of the axle A. This hub is of hollow construction and comprises an inner cylinder 22, an intermediate cylinder 23 and an outer cylinder 24 connected to the cylinder 23 by a conical portion 25. At the junction of the portion 25 and the cylinder 24 the hub is interiorly formed with an annular shoulder 26, while at the junction of the cylindrical portions 22 and 23, is a similar annular shoulder 27.

As shown in Fig. 1, the bearing assembly B is on the axle portion 16 and within the cylinder 22, while the bearing assembly B1 is on the axle portion 18 and within the cylinder 24. These bearing assemblies are of the roller type with the inner races 28 on the axle and the outer races 29 abutting the respective shoulders 26 and 27. The outer race of the bearing assembly B1 is retained in position on the axle by the nut 20 and the washer 21, and a cap 30 secured on the flange 31 formed on the outer end of the hub, houses the nut and closes the outer end of the hub.

Figure 3:
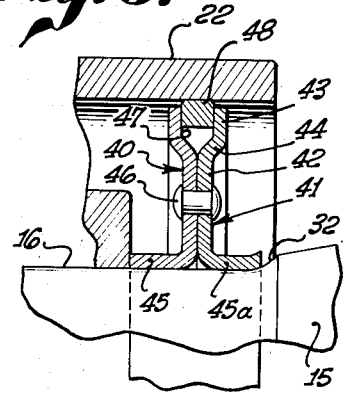
Fig. 3 is an enlarged fragmentary vertical view taken on the line 3—3 of Fig. 2.

As best shown in Fig. 3, that end of the cylindrical axle portion 16 facing the tapered axle portion 15 is formed with an outwardly increasing radius providing an annular cam 32 the function of which will be later described herein.

As shown in Fig. 1 the hub cylinder 23 has on its exterior a flange 33, and extending through this flange are studs 34 for securing a wheel 35 thereto, as well as a brake drum 36. Accordingly, both the wheel and the brake drum are secured to the hub for rotation therewith, the brake drum being in surrounding relation to the axle and containing any form of brake shoes (not shown) operable to engage the drum by rotation of a shaft 39.

The sealing device of my invention comprises a ring shaped body R which is made up of two identical annuli 40 and 41 preferably stamped from steel sheets of the requisite heavy gauge. Each annuli comprises a flat annular portion 42, an outer peripheral portion 43 which, by bending the metal laterally as at 44, is offset in relation to the portion 42 so as to be disposed in a plane paralleling that of the portion 42. On the inner periphery of the portion 42 the metal is extended substantially at right angles therefrom to provide an annular collar 45 in the case of the annulus 40, and an annular collar 45a in the case of the annulus 41.

The two annuli 40 and 41 as assembled to form the body R are secured to each other by rivets 46 which extend through the flat portions 42 at intervals in a circumferential series. As assembled, the annuli are reversely disposed one to the other so that the bent portions 44 diverge from each other to position the portions 43 in spaced parallelism to provide therebetween an annular groove 47 with flat parallel side walls. The collars 45 and 45a extend to opposite sides of the body R and combine to form a tube having an inside diameter such that it can have a slip fit on the cylindrical axle portion 16 when applied thereto.

In the annular groove 47 is received a split expanding metal ring 48 which, as will be understood, is adapted to be snapped into place before the device is applied to the axle A. This ring has a flat outer periphery and flat sides to slide transversely as well as circumferentially on the flat side walls of the groove, and yet provide a substantial fluid tight seal between the two.

To apply the sealing device to the axle A it is slipped over the small end thereto and then pressed to the position shown before the wheel hub is applied to the axle A. As the device is pressed to this position the leading end of the collar 45a abuts the cam 32 and, being of smaller diameter than the cam, is jammed into secure engagement therewith to lock the body R against turning movement on the axle, and also to effect a fluid tight seal between the collar and the axle.

Upon subsequent application to the axle of the wheel hub H with the bearing assemblies, the inner race 28 of the bearing B is brought into engagement with the edge of collar 45, and such collar being now immovable inwardly on the axle, is caused to coact with the shoulder 27 to hold the bearing B in proper place on the axle, and the sealing device against movement outwardly on the axle. As the hub H is moved to the position described the cylinder 22 passes over the ring 48 constricting the latter so that it expands into fluid sealing contact with the inner surface of the cylinder 22 to be secured to the cylinder for rotation therewith.

Following mounting of the hub on the axle, the hub is secured in position thereon by application of the washer 21 and the nut 20, followed by securing the cap 30 to the hub to close the outer end of the latter. The brake drum 36 and the wheel 35 are usually applied to the hub after the latter is mounted on the axle.

With the sealing device in position between the axle and the hub, as above-described, rotation of the hub by the wheel causes the ring 48 to rotate with the hub and in the groove 47 of the body R, the latter remaining stationary on the axle. Since the ring 48 has sealing engagement with the hub cylinder 22, and the collar 45a has sealing engagement with the axle, it is evident that my device functions to seal the cylinder 22 against egress of grease from the hub, and the ingress of dirt, water or any other foreign matter into the hub.

My sealing device is capable of preventing liquified grease from flowing out of the hub and thus starving the bearings of lubricant. Therefore, it is especially useful in a hub and brake drum assembly such as here shown, and particularly when the assembly is used on a logging trailer where the brakes are subject to long and frequent applications as when descending long and mountainous grades. Such brake applications cause the brake drum to become heated to such a high degree that, as transmitted to the hub and then to the bearings, the heat reduces the grease to a liquid. If this liquid were permitted to flow out of the hub, it would not only result in burning out of the bearings, but it would flow into the brake drum and cause the brake to become wholly ineffective. Since my sealing device is effective to prevent the liquified grease from running out of the hub, the grease is not only confined therein to lubricate the bearing, but prevented from flowing into the brake drum to maintain the brake effective.

Although I have herein shown and described only one form of sealing device embodying my invention and one form of axle and hub with which the device is associated, it is to be understood that various changes and modifications may be made herein without departing from the spirit of my invention and the spirit and scope of the appended claims.

What I claim is:

1. As an article of manufacture, a lubricant sealing device including a pair of identical annuli, each having a flat annular portion, an outer peripheral portion offset laterally with relation to said flat portion and then extended in a plane paralleling said flat portion, and an annular collar on the inner periphery of said flat portion; means securing said annuli to each other so that said flat portions are in abutting relationship; said outer peripheral portions being opposed to form an annular groove therebetween, said collars extending outwardly in opposite directions, and a split expanding ring in said groove.

2. A lubricant sealing device for use on an axle having a cylindrical portion and an annular cam at one end of the cylindrical portion, including: a body constructed of sheet metal and comprising two identical annuli, each having a flat annular portion, an outer peripheral portion offset laterally with relation to said flat portion and then extended in a plane paralleling said flat portion, and an annular collar on the inner periphery of said flat portion; means securing said annuli to each other so that said flat portions are in abutting relationship; said outer peripheral portions being opposed to form an annular groove therebetween, said collars extending outwardly in opposite directions and coaxially positioned so that when the device is pressed axially onto the cylindrical axle portion in the direction of the annular cam, the leading collar will be jammed by the cam into locking and fluid-tight engagement with the axle; and a split ring in the groove.

References Cited in the file of this patent

UNITED STATES PATENTS

| | | |
|---|---|---|
| 516,398 | Moore | Mar. 13, 1894 |
| 1,288,291 | Timken | Dec. 17, 1918 |
| 1,484,350 | Cusick | Feb. 19, 1924 |
| 1,676,784 | Krause | July 10, 1928 |
| 1,722,489 | Bott | July 30, 1929 |
| 1,991,077 | Brittain | Feb. 12, 1935 |
| 2,271,166 | Weiss | Jan. 27, 1942 |
| 2,367,403 | Kosalka | Jan. 16, 1945 |
| 2,474,283 | Simpkins | June 28, 1949 |
| 2,644,575 | Mercier | July 7, 1953 |

FOREIGN PATENTS

| | | |
|---|---|---|
| 203,177 | Great Britain | of 1923 |